(12) United States Patent
Breiholz

(10) Patent No.: US 7,039,292 B1
(45) Date of Patent: May 2, 2006

(54) OPTICAL SYSTEM FOR VEHICLE FLIGHT CONTROL

(75) Inventor: Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 82 days.

(21) Appl. No.: 10/936,928

(22) Filed: Sep. 9, 2004

(51) Int. Cl.
*G02B 6/00* (2006.01)
(52) U.S. Cl. ...................................... 385/147
(58) Field of Classification Search ............... 385/147
See application file for complete search history.

(56) References Cited

U.S. PATENT DOCUMENTS

| | | | | |
|---|---|---|---|---|
| 4,632,508 | A | * | 12/1986 | Connelly ............... 359/572 |
| 5,675,489 | A |  | 10/1997 | Pomerieau |
| 5,923,456 | A |  | 7/1999 | Tench |
| 6,166,847 | A |  | 12/2000 | Tench |
| 6,348,942 | B1 | * | 2/2002 | Watkins ............... 348/81 |
| 2005/0139672 | A1 | * | 6/2005 | Johnson et al. ........ 235/454 |

OTHER PUBLICATIONS

Behavior-Oriented Vision for Biomimetic Flight Control, Titus R. Neumann, Heinrich H. Buithoff, *Proceedings of the EPSRC/BBSRC International Workshop on Biologically Inspired Robotics—The Legacy of W. Grey Walter*, Aug. 14-16, 2002, HP Labs Bristol, UK, pp. 196-203 (2002).
"Unmanned Aircraft Adapting to Army Future Force Needs", *National Defense*, Dec. 2003.

* cited by examiner

*Primary Examiner*—Ellen E. Kim
(74) *Attorney, Agent, or Firm*—Nathan O. Jensen; Kyle Eppele

(57) ABSTRACT

A switchable optical system includes a primary optical system positioned to receive a forward view image, forward from the vehicle, during a reconnaissance mode of operation. A secondary optical system is operatively associated with the primary optical system for receiving opposing side images, side-looking from the vehicle. An imaging sensor is operatively associated with the primary optical system and with the secondary optical system. A mode switch is operatively associated with the primary optical system and the secondary optical system for switching between the reconnaissance mode of operation and a biomimetic mode of operation. The forward view image is sensed by the imaging sensor during the reconnaissance mode of operation; and, a portion of the forward view image and the opposing side images are simultaneously sensed by the imaging sensor for balancing the optic flow during the biomimetic mode of operation.

20 Claims, 6 Drawing Sheets

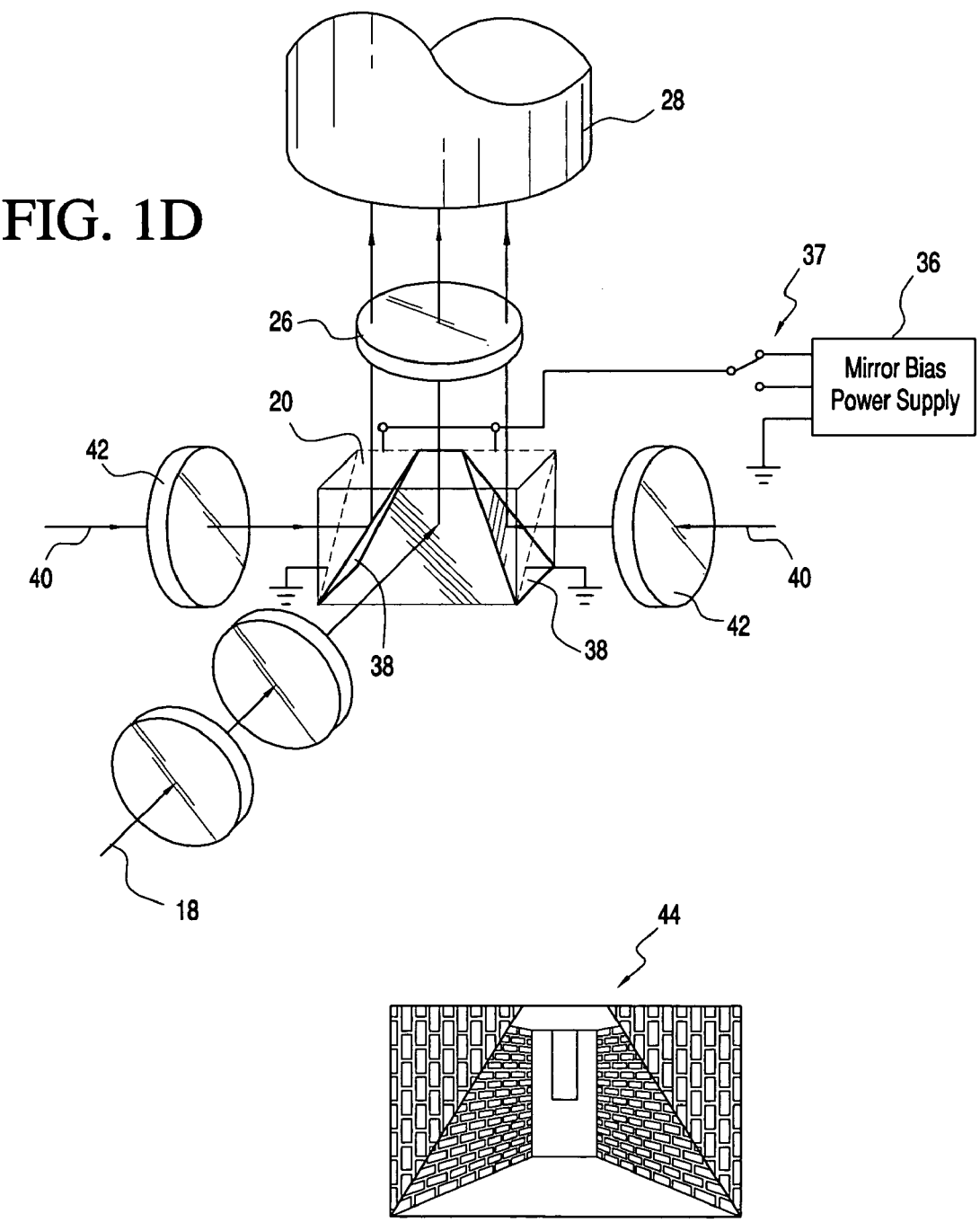

OPTICAL SYSTEM FOR VEHICLE FLIGHT CONTROL

BACKGROUND OF THE INVENTION

1. Field of the Invention

The present invention relates to biologically motivated visual flight control systems and more particularly to a flight control system including a biomimetic mode for attitude control by balancing the sideways optical flow.

2. Description of the Related Art

Flying insects such as houseflies have sensory-motor abilities that still outperform those of unmanned air vehicles (UAV's). There is currently no obvious solution to the problem of deciding the type of sensor system to equip a small UAV capable of flying in narrow and complex environments which may include, for example, trees, buildings, corridors and caves.

The paper entitled "Behavior-Oriented Vision for Biomimetic Flight Control", Titus R. Neumann, Heinrich H. Buithoff, *Proceedings of the EPSRC/BBSRC International Workshop on Biologically Inspired Robotics—The Legacy of W. Grey Walter*, 14–16 Aug. 2002, HP Labs Bristol, UK, pp. 196–203 (2002) discusses tuning the depicted receptive field to detect differences of translatory optic flow in the left and right frontolateral regions of the visual field. The sign of the output signal indicates whether the relative object nearness is larger on the left or on the right side of the agent. Thus, it can be used to avoid potential obstacles by turning toward the direction of minimal image motion.

The paper entitled "A Biomimetic Reactive Navigation System Using the Optical Flow for a Rotary-Wing UAV in Urban Environment", Laurent Muratet, Stephane Doncieux, Jean-Arcady Meyer, *AnimatLab*, LIP 6, University of Paris 6—CNRS, France, discusses the use of balance strategy that equalizes the perceived pixel velocities to tend to maintain equal distances to obstacles on both sides of a helicopter. The authors utilized control laws that served to balance the optical flow.

As will be disclosed below, the present invention provides a system for utilizing a single sensor for implementing efficient reconnaissance and biomimetic flight and therefore enabling miniaturization of the flight vehicle. This may be particularly useful for various future defense force needs which may involve, for example, the combination of unmanned aerial vehicles and piloted rotorcraft. As discussed in the article entitled "Unmanned Aircraft Adapting to Army Future Force Needs", *National Defense*, December 2003, traditionally, UAV's have been controlled by a ground station, but may be very useful in being flown along with a helicopter to be the eyes, ears and sensors forward for the manned system.

SUMMARY OF THE INVENTION

In a broad aspect, the switchable optical system includes a primary optical system positioned to receive a forward view image, forward from the vehicle, during a reconnaissance mode of operation. A secondary optical system is operatively associated with the primary optical system for receiving opposing side images, side-looking from the vehicle. An imaging sensor is operatively associated with the primary optical system and with the secondary optical system. A mode switch is operatively associated with the primary optical system and the secondary optical system for switching between the reconnaissance mode of operation and a biomimetic mode of operation. The forward view image is sensed by the imaging sensor during the reconnaissance mode of operation; and, a portion of the forward view image and the opposing side images are simultaneously sensed by the imaging sensor for balancing the optic flow during the biomimetic mode of operation.

A likely application of the present invention is for use with a flight control system for a small autonomous vehicle designed to explore a building or a cave and send images of what it finds to its operators (a basic reconnaissance function). The biomimetic approach of the present invention provides an effective means to guide the vehicle down the center of a constrained passageway (like a hallway in a building), avoiding walls and obstacles, by balancing the "optic flow" of the visual fields to the right and to the left of the vehicle.

Many researchers, like the authors of the first paper cited in the Background of the Invention entitled "Behavior-Oriented Vision for Biomimetic Flight Control" carry the biomimetic analogy to the point of using a lens on the sensor that mimics the multifaceted, wide-angle view of an insect's eye. Such a lens, though, distorts the image to a degree that makes it difficult to use the imagery for the reconnaissance function.

The authors of the second paper cited above, entitled "A Biomimetic Reactive Navigation System Using the Optical Flow for a Rotary-Wing UAV in Urban Environment," use a forward-looking camera with an ordinary wide angle lens. That approach complicates the mathematics of the biomimetic algorithm, making it more difficult to differentiate changes of lateral position from rotational effects.

A third approach might conceivably use separate cameras looking forward, to the right, and to the left. That approach would provide optimal reconnaissance and biomimetic guidance functions at the cost of the additional camera circuitry.

The present invention functions in a manner similar to the 3-camera approach but uses a single sensor coupled with an optical system having two modes: a reconnaissance mode in which the entire sensor is dedicated to looking forward, and a biomimetic mode in which a portion of the sensor continues to look forward while two other portions look to the right and left to support optic flow observations. This approach has the potential to require less power and to be physically smaller than a multi-sensor approach.

BRIEF DESCRIPTION OF THE DRAWINGS

FIG. 1D is a perspective view of the switchable optical system of the flight control system of the present invention shown in a biomimetic mode of operation.

FIG. 1E is a perspective view of the corridor of FIG. 1A as seen through the sensor of the switchable optical system of FIG. 1D in a biomimetic mode of operation.

DETAILED DESCRIPTION OF THE INVENTION

Figure 1A:
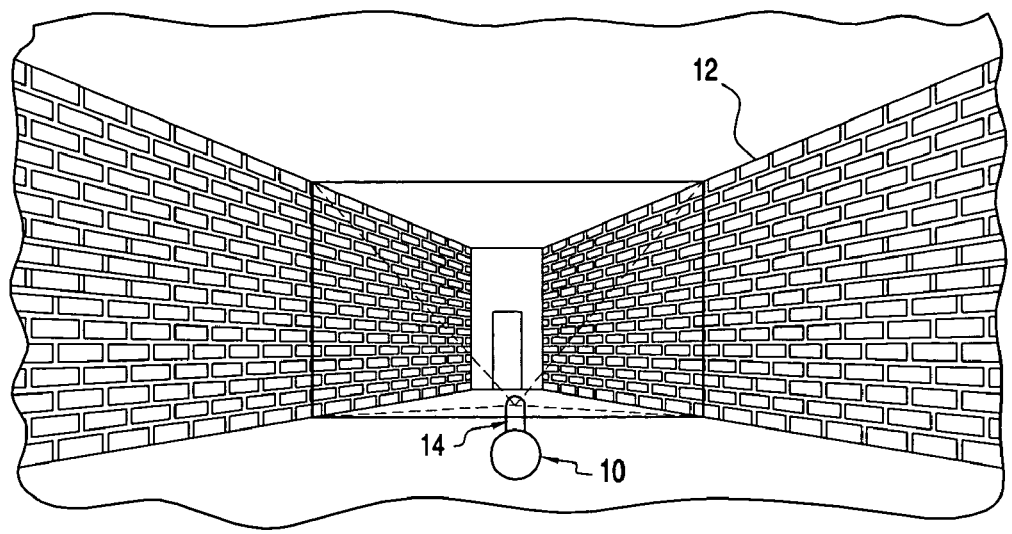
FIG. 1A is a perspective view of a vehicle utilizing a flight control system of the present invention traveling through a corridor.

Referring now to the drawings and the characters of reference marked thereon, FIG. 1A illustrates a vehicle 10 utilizing a flight control system of the present invention traveling through a corridor 12. Flight through a space such as a corridor 12 is made possible by the use of the flight control system that includes the switchable optical system of the present invention, designated generally as 14.

Figure 1B:
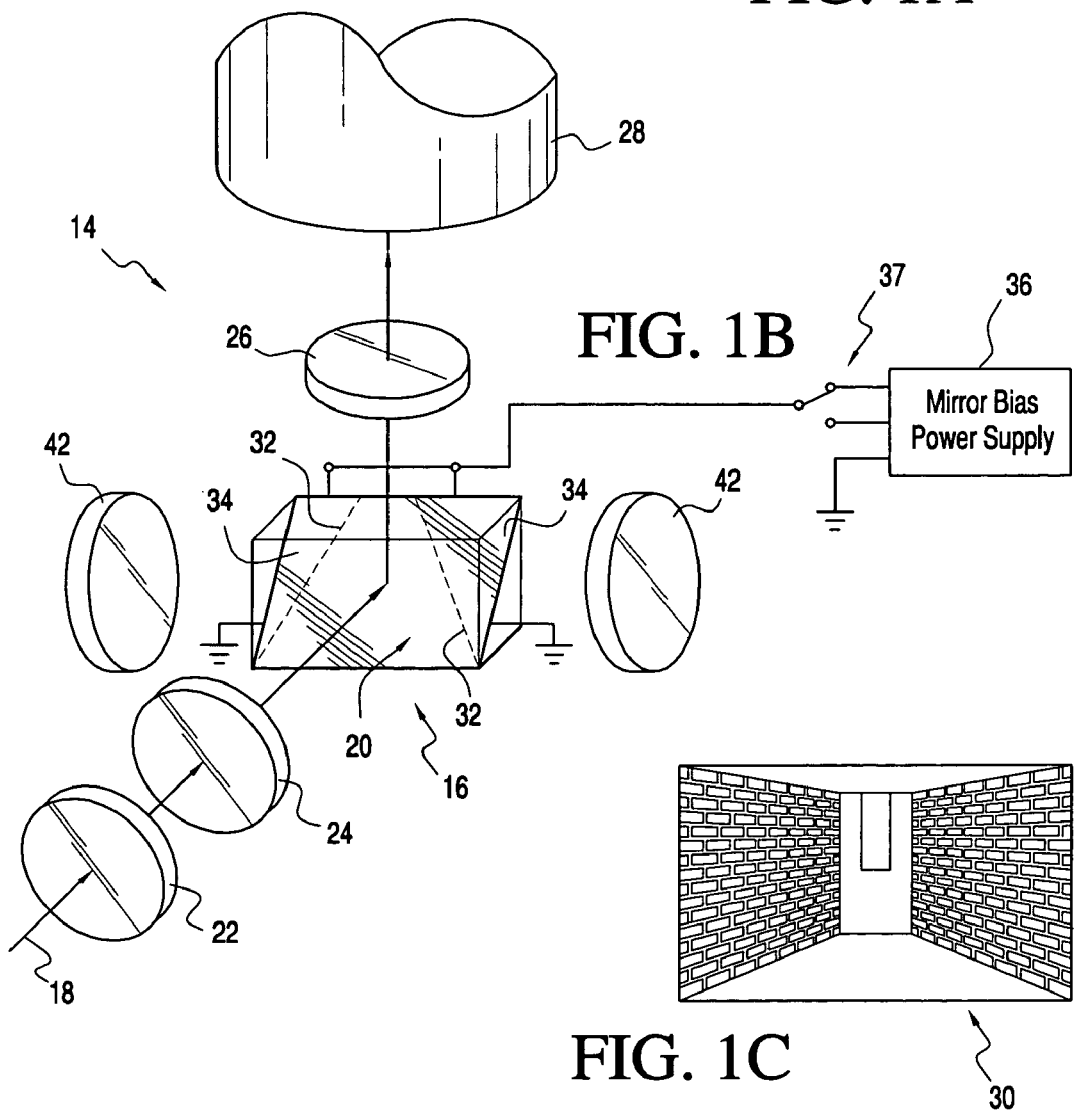
FIG. 1B is a perspective view of the switchable optical system of the flight control system of the present invention shown in a reconnaissance mode of operation.

FIG. 1B depicts switchable optical system 14 of the flight control system in a reconnaissance mode of operation. A primary optical system, designated generally as 16, is positioned to receive a forward view image 18, forward from the vehicle 10. The primary optical system includes a primary mirror 20 that is positioned to receive the forward view image 18 and for reflecting that forward view image approximately 90 degrees. Prior to being received by the primary mirror 20 the forward view image 18 is typically received by a propagation control element or front lens system such as a single lens or compound lens 22,24. Typically, compound lenses 22, 24 are utilized. This optical system allows a forward-looking image to be formed, taking advantage of the entire sensor area for reconnaissance or surveillance applications. After being reflected, the forward view image 18 is transmitted through another propagation control element of the primary optical system, i.e. lens 26, prior to its transmission to an imaging sensor 28. The imaging sensor 28 may be a charge-coupled device or CMOS television focal plane array, or an infrared or ultraviolet focal plane array.

Figure 1C:
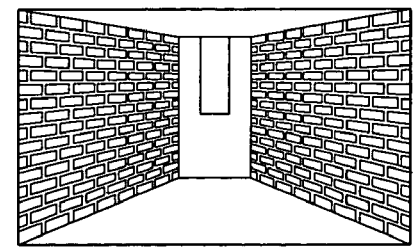
FIG. 1C is a perspective view of the corridor of FIG. 1A as seen through the sensor of the switchable optical system of FIG. 1B in a reconnaissance mode of operation.

Thus, during this reconnaissance mode of operation, the optical system 10 is only seeing a forward view image as seen by reference to FIG. 1C which is an inverted or reversed forward view 30 as seen by the sensor 28.

In a biomimetic mode of operation, peripheral portions of the primary mirror 20, denoted by corner portions 34 outside of dashed lines 32 are optically removed. Although corner portions 34 are illustrated these peripheral portions 34 can be a variety of shapes depending upon the application. The optical removal is accomplished by some type of a mode switch. The primary mirror 20 illustrated in FIG. 1B may be an electronically controlled mirror. One exemplary embodiment of an electronically controlled mirror is a reversible electrochemical mirror (REM). The corner portions 34 are activated portions of the REM. The central portion of the primary mirror 20 is not activated. The REM operates through a controlled plating of reflective metal onto a glass surface. A metallic compound is maintained in solution between two glass plates. With the application of a specific control current from a power source 36 using a switch 37, the metal is plated onto the surface of one of the two glass plates, thereby creating a highly reflective mirror. With the application of a second control current, the metal is returned into a solution, which eliminates the reflective properties of the mirror, and allows light to pass through the REM. The mirror can be constructed of multiple layers of glass covered by metal layers. The metal layers are responsive to current flow therethrough, thereby selectively providing a reflective or transmissive property for the mirror.

Such REM mirrors are described in various patents and publications such as U.S. Pat. No. 5,923,456 entitled "Reversible Electrochemical Mirror", incorporated in its entirety by reference herein; U.S. Pat. No. 6,166,847 entitled "Reversible Electrochemical Mirror for Modulation of Reflected Radiation" incorporated in its entirety by reference herein; and, the article entitled "New Electrochromic Mirror Systems" by Thomas J. Richardson, Environmental Energy Technologies Division, Lawrence Berkeley National Laboratory (http://www.lbl.gov/Tech-Transfer/publications/1817IME5SwitchableMirrors.pdf).

The means for removing the peripheral portions 34 may be mechanical means. As an example, a hinged mirror moved by a solenoid- or stepper motor-driven mechanism may be used.

As can be seen in FIG. 1D, a pair of secondary mirrors 38 are positioned optically behind the peripheral portions of the primary mirror 20. In this figure the switch 37 provides the second control current which allows light to pass through the REM 20 to the secondary mirrors 38. These secondary mirrors 38 are angled so that during biomimetic flight opposing side images 40 are received by the pair of secondary mirrors 38 and directed to the sensor 28. Suitable lenses 42 are utilized. A portion of the forward view image is simultaneously received by the primary mirror thereby providing the capability of balancing the optic flow while still maintaining a forward view during the biomimetic mode. FIG. 1E illustrates a view 44 showing the simultaneous sensing of the two opposing side images 40 as seen by the sensor 28. This first embodiment is advantageous where minimizing the size of the vehicle is an important design factor. For example, this implementation may enable a vehicle compact enough so that even multiple vehicles could be hand carried by a soldier during operations.

Figure 2A:
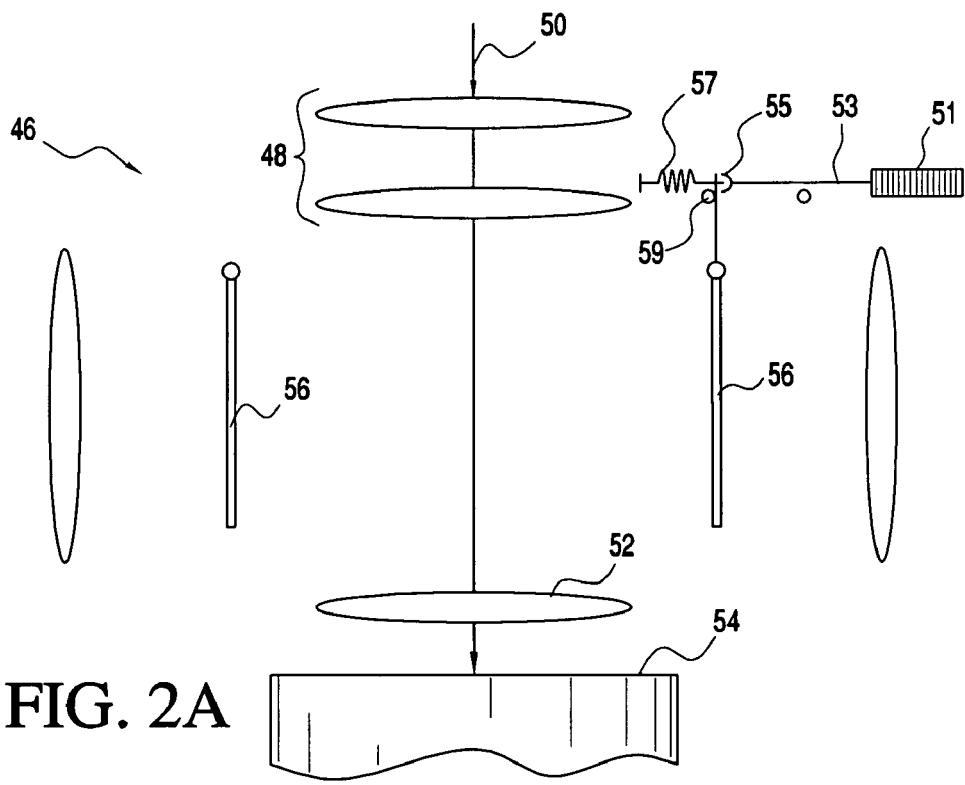
FIG. 2A is a top schematic view of a second embodiment of the switchable optical system that uses a rear mounted imaging sensor, in a reconnaissance mode of operation.

Referring now to FIG. 2A, a second embodiment of the switchable optical system of the present invention is illustrated, designated generally as 46. In this embodiment, during the reconnaissance mode, a front lens system 48 is positioned to receive the forward view image 50 and transmit the forward image 50 to a rear portion of the primary optical system. The forward view image 50 is transmitted through rear lens 52 and then to an imaging sensor 54.

Figure 2B:
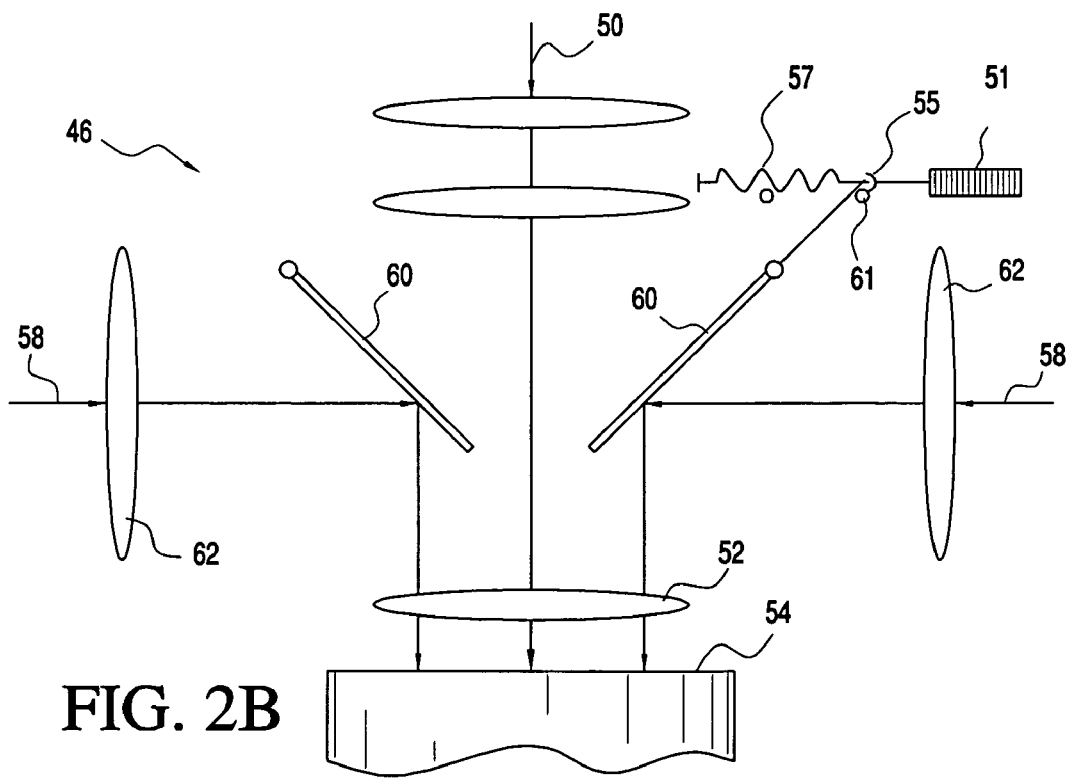
FIG. 2B is a top schematic view of the third embodiment of FIG. 2A, in a biomimetic mode of operation.

In the biomimetic mode shown in FIG. 2B, a pair of secondary mirrors 56, which are positioned optically behind the front lens system 48, are introduced into the optical path provided by the forward view image 50. This may be accomplished by, for example, an electromechanical mode switch. One example, of such a mode switch is illustrated involving a solenoid coil 51, shaft 53, coupling 55, and mirror return spring 57. In FIG. 2A the solenoid 51 is not activated and the spring 57 is in a relaxed position. A stop peg 59 is engaged. In FIG. 2B, the solenoid 51 is activated and the spring 57 stretched. In this instance the stop peg 61 is engaged.

Other means for repositioning the secondary mirrors 56 may include, for example, a stepper motor, as mentioned above or other devices such as a linear motor, pneumatic or hydraulic cylinder, or mechanical lever mechanism driven by a spring drive.

During this biomimetic mode, opposing side images 58 are transmitted through a pair of lenses 62 and directed to the secondary mirrors 60. The mirrors 60 are at about a 45 degree angle from the initial optical paths of the side images 58. The forward view image 50 is simultaneously received by the imaging sensor 54 thereby providing the capability of balancing the optic flow during the biomimetic mode. This second embodiment is most useful in applications where space is not as great a factor as the first embodiment.

Figures 3A, 3B:
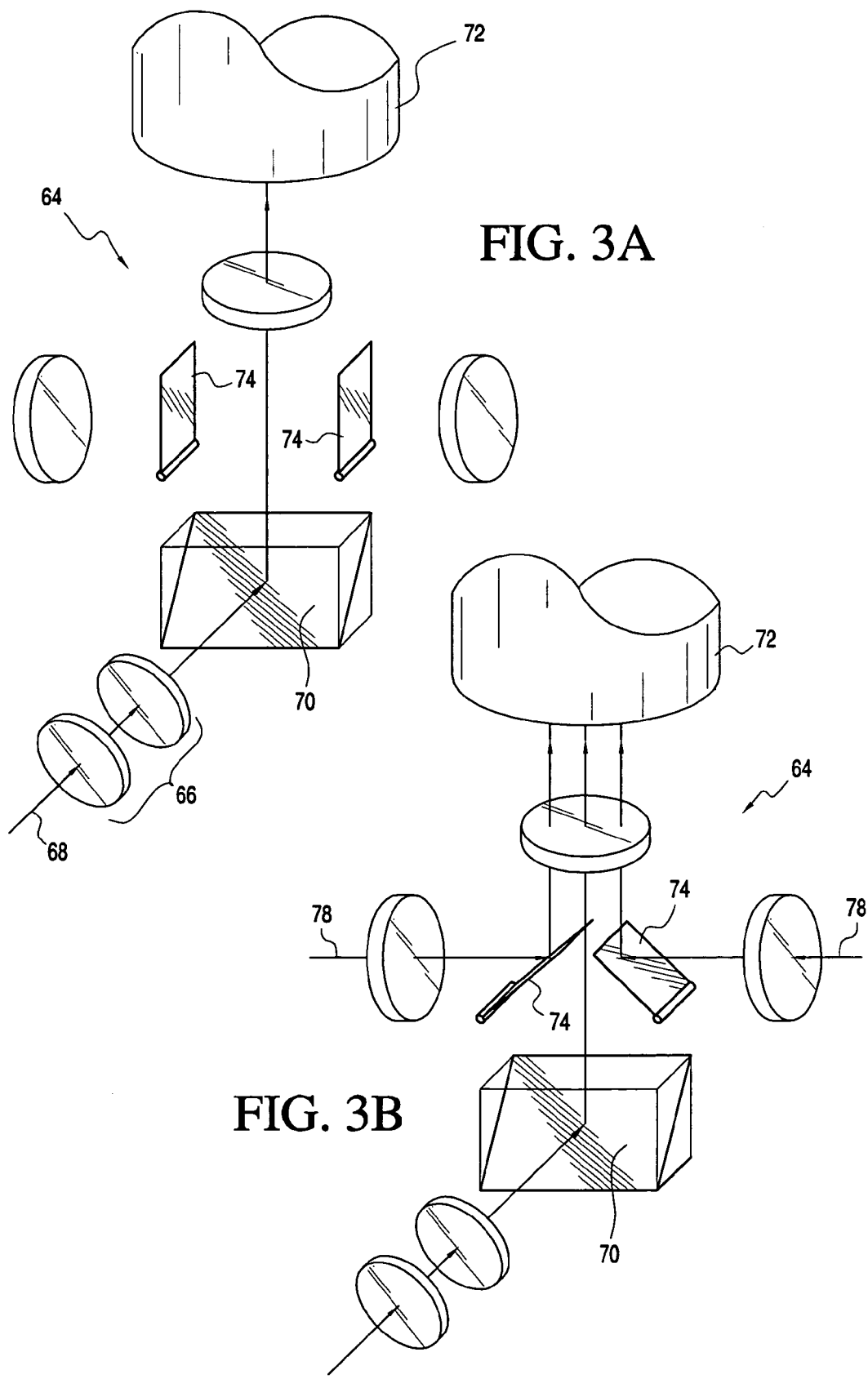
FIG. 3A is a perspective view of a third embodiment of the switchable optical system, in a reconnaissance mode of operation.
FIG. 3B is a perspective view of the third embodiment in a biomimetic mode of operation.

Referring now to FIG. 3A a third embodiment of the switchable optical system of the present invention is illustrated, designated generally as 64. In this embodiment, during the reconnaissance mode, a front lens system 66 is positioned to receive the forward view image 68 which is reflected from a primary mirror 70 of a primary optical system. As in the first embodiment, the primary mirror 70 is positioned to receive the forward view image 68 and for reflecting the forward view image 68 approximately 90 degrees toward the imaging sensor 72. A pair of secondary mirrors 74 are mounted between the primary mirror 70 and the imaging sensor 72. During the reconnaissance mode of operation the pair of secondary mirrors 74 is oriented outside of the optical path of the forward view image.

Referring now to FIG. 3B, repositioning means (not shown) are provided so that during biomimetic operation the secondary mirrors 74 can be mechanically swung into position to receive the opposing side images 78. The repositioning means 76 may be, for example, as discussed above with respect to the FIG. 2 embodiment. This embodiment is useful if the system is not constrained to be maximally compact. The choice between the various embodiments is generally driven by the geometry of the payload enclosure and by choice of the most efficient switching mechanism given the vehicle power sources and cost target.

Figure 4A:
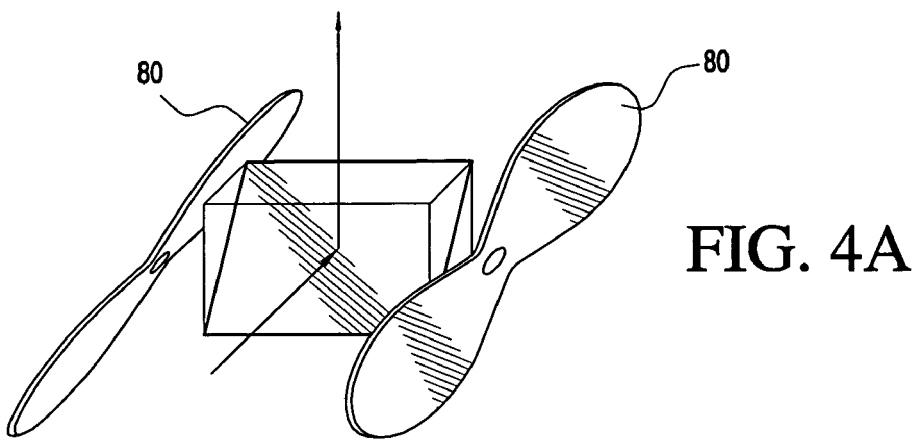
FIG. 4A is perspective view of a switchable optical system utilizing propeller-shaped, diagonally mounted, mirrored rotary shutters for the secondary optical system.
Figure 4B:
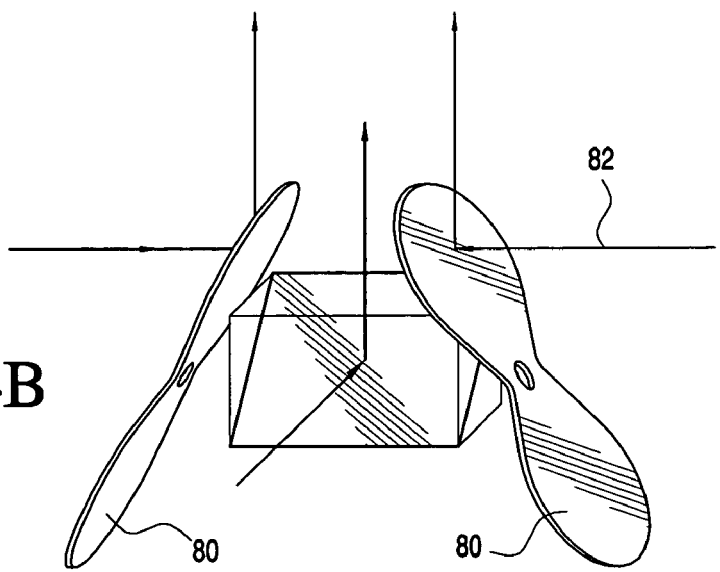
FIG. 4B illustrates the FIG. 4A embodiment in a biomimetic mode of operation.

There are various other ways to provide the secondary optical system. Referring now to FIG. 4A, the secondary optical system comprises a pair of flat, propeller-shaped, diagonally mounted, mirrored rotary shutters 80. These replace the diagonal mirrors of the previous embodiment. They may be similar to those used in motion picture cameras and projectors. FIG. 4B shows the secondary mirrors 80 oriented to receive the opposing side images 82. The rotating plate of the rotary shutter is silvered to form a mirror. The plate is mounted so that when the silvered portion is in the optical path, it is oriented at 45 degrees so as to serve the function of diagonal mirror in the preceding embodiment. In this position both the primary and secondary optical systems are visible to the sensor. When the shutter plate is rotated to remove the silvered portion from the optical path, the mirror is effectively removed and only the primary optical system is visible to the sensor. The shape of the rotating plate is arbitrary as long as it provides one or more portions that serve as diagonal mirrors and one or more portions that remove the mirror from the optical path.

The rotary shutter can be operated by any of a variety of mechanisms—e.g. electric motor, stepper motor, mechanical escapement mechanism, or drive from the vehicle motor. The rotary design can potentially reduce vibration and noise over other mechanical implementations. It also offers the option of continuously rotating the shutter in synchronism with the frame rate of the sensor such that alternating frames from the sensor are formed in reconnaissance mode and in biomimetic mode. Subsequent processing can de-interleave these frames to form two continuous streams of imagery, one in reconnaissance mode and the other in biomimetic mode.

Figure 4C:
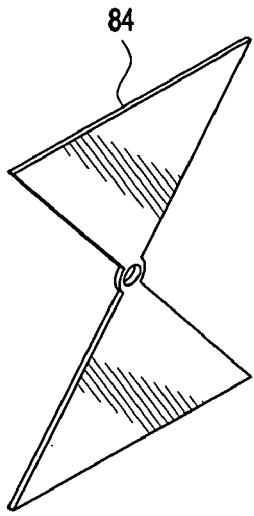
FIG. 4C is a perspective view of an alternate shape of the mirrored rotary shutters.
Figure 4D:
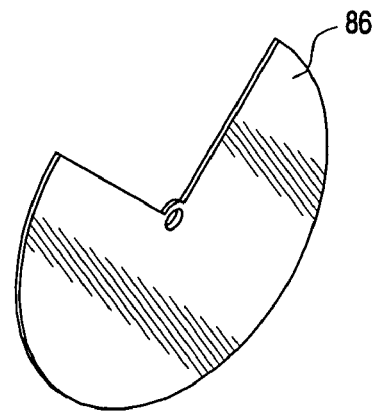
FIG. 4D is a perspective view of another alternate shape of the mirrored rotary shutters.

The rotary shutter can be any of a variety of shapes such as the examples denoted 84 and 86 in FIGS. 4C and 4D, respectively.

Figure 5:
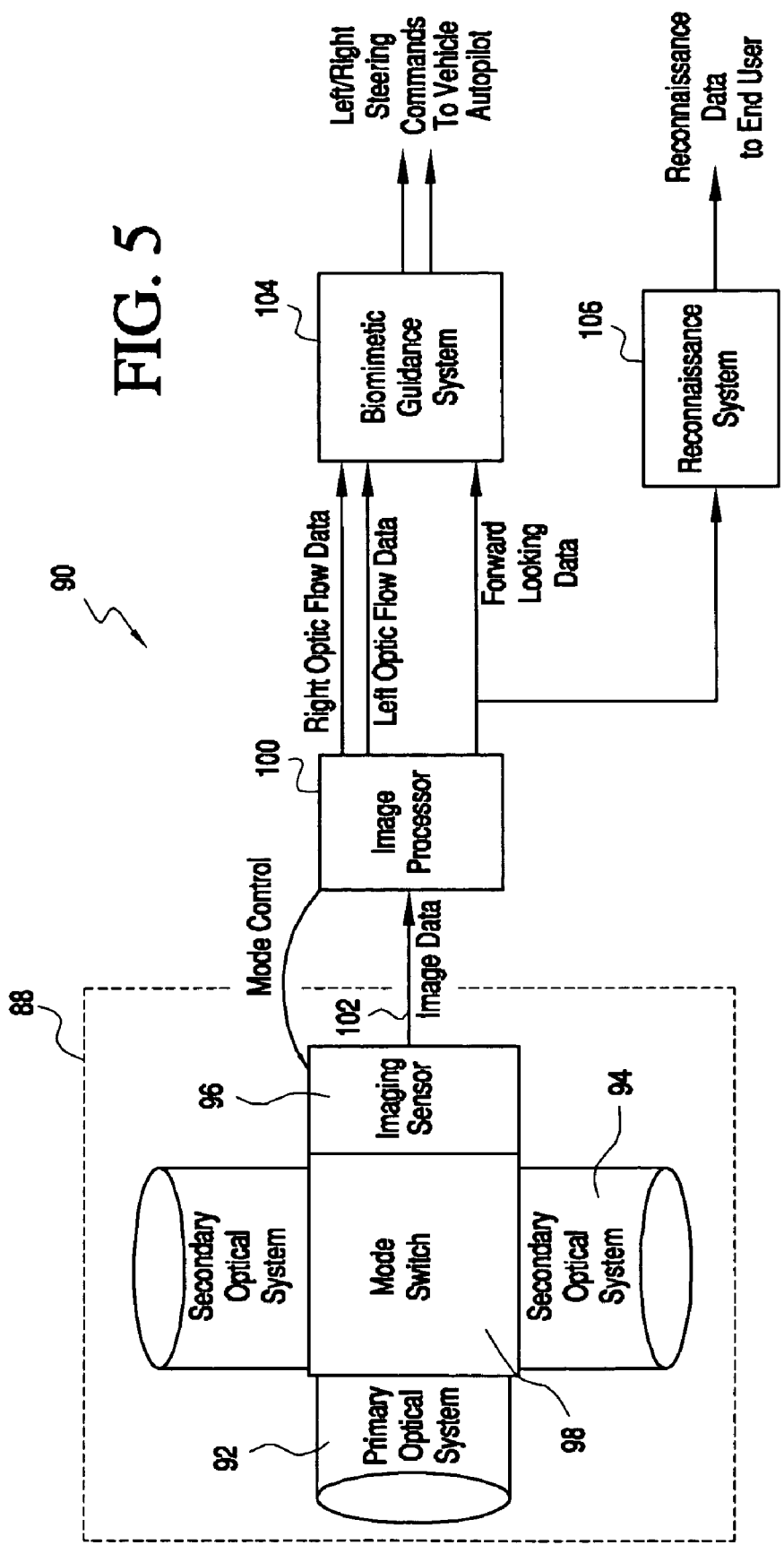
FIG. 5 is a block diagram of a flight control system incorporating the switchable optical system.

Referring now to FIG. 5, utilization of a switchable optical system 88 of the present invention in a flight control system, designated generally as 90, of a vehicle is illustrated. As was explained in detail above, the switchable optical system 88 includes a primary optical system 92, a secondary optical system 94, an imaging sensor 96, and a mode switch 98.

An image processor 100 is connected to the switchable optical system 88 for receiving the image data 102 from the imaging sensor 96. The image processor 100 processes the image data and provides right optic flow data, left optic flow data and forward looking data. The image processor also provides mode control feedback data to the mode switch 98.

A biomimetic guidance system 104 receives the right optic flow data, left optic flow data, and forward looking data and provides left and right steering commands to the vehicle autopilot. A reconnaissance system 106 receives the forward looking data and provides reconnaissance data (possibly video) to a human intelligence analyst or to an automatic target recognition system.

Other embodiments and configurations may be devised without departing from the spirit of the invention and the scope of the appended claims.

The invention claimed is:

1. A switchable optical system for a flight control system of a vehicle, comprising:
   a primary optical system positioned to receive a forward view image, forward from the vehicle, during a reconnaissance mode of operation;
   a secondary optical system operatively associated with said primary optical system for receiving opposing side images, side-looking from the vehicle, during a biomimetic mode of operation;
   an imaging sensor operatively associated with said primary optical system and with said secondary optical system; and,
   a mode switch operatively associated with said primary optical system and said secondary optical system for switching between said reconnaissance mode of operation and said biomimetic mode of operation,
   wherein said forward view image is sensed by said imaging sensor during said reconnaissance mode of operation and a portion of said forward view image and said opposing side images are simultaneously sensed by said imaging sensor for balancing the optic flow during said biomimetic mode of operation.

2. The switchable optical system of claim 1,
   wherein said primary optical system comprises:
   a primary mirror positioned to receive said forward view image and for reflecting said forward view image approximately 90 degrees,
   wherein said mode switch comprises means for optically removing peripheral portions of said primary mirror for said biomimetic mode; and,
   wherein said secondary optical system comprises:
   a pair of secondary mirrors positioned optically behind said peripheral portions of said primary mirror,
   wherein during biomimetic flight opposing side images are received by said pair of secondary mirrors and said portion of said forward view image is simultaneously received by said primary mirror, thereby providing the capability of balancing the optic flow during said biomimetic mode.

3. The switchable optical system of claim 2 wherein said means for optically removing said peripheral portions of said primary mirror comprises mechanical means for moving said peripheral portions in the desired orientation to optically remove them.

4. The switchable optical system of claim 2 wherein said means for optically removing said peripheral portions of said primary mirror comprises electrical switching means for optically removing them.

5. The switchable optical system of claim 2 wherein said primary mirror comprises an electronically controlled mirror.

6. The switchable optical system of claim 2 wherein said primary mirror comprises a reversible electrochemical mirror (REM).

7. The switchable optical system of claim 2 wherein said peripheral portions comprise corners of said means for optically removing said peripheral portions of said primary mirror comprises mechanical means for flipping said peripheral portions in the desired orientation to optically remove them.

8. The switchable optical system of claim 1,
wherein said primary optical system, comprises:
a front lens system positioned to receive said forward view image and transmit said forward image to a rear portion of said primary optical system; and,
wherein said secondary optical system, comprises:
a pair of secondary mirrors positioned optically behind said front lens system and introducible into the optical path provided by said forward view image during said biomimetic mode, opposing side images being received by said pair of secondary mirrors and said forward view image being simultaneously received by said imaging sensor thereby providing the capability of balancing the optic flow during said biomimetic mode.

9. The switchable optical system of claim 8, further comprising a rear lens system at a rear portion of said primary optical system for receiving said transmitted forward view image.

10. The switchable optical system of claim 8 wherein said pair of secondary mirrors are introducible into the optical path at about a 45 degree angle to said optical path.

11. The switchable optical system of claim 8 wherein said secondary optical system further includes a secondary lens system for transmitting said opposing side images to said pair of secondary mirrors.

12. The switchable optical system of claim 10 wherein said means for introducing said pair of secondary mirrors into the optical path comprises electrical switching means for introducing them.

13. The switchable optical system of claim 10 wherein said means for introducing said pair of secondary mirrors into the optical path comprises mechanical switching means for introducing them.

14. The switchable optical system of claim 1,
wherein said primary optical system comprises:
a primary mirror positioned to receive said forward view image and for reflecting said forward view image approximately 90 degrees toward said imaging sensor; and,
wherein said secondary optical system comprises:
a pair of secondary mirrors mounted between said primary mirror and said imaging sensor, wherein during said reconnaissance mode of operation said pair of secondary mirrors are oriented outside of the optical path of said forward view image, said secondary optical system further comprising means for repositioning said secondary mirrors such that, during said biomimetic mode, said opposing side images are received by said secondary mirrors and directed toward said imaging sensor.

15. The switchable optical system of claim 1, wherein said secondary optical system comprises a pair of rotary shutters.

16. The switchable optical system of claim 1, wherein said secondary optical system comprises a pair of diagonally mounted, mirrored rotary shutters.

17. A flight control system for a vehicle, comprising:
a) a switchable optical system, comprising:
i. a primary optical system positioned to receive a forward view image, forward from the vehicle, during a reconnaissance mode of operation;
ii. a secondary optical system operatively associated with said primary optical system for receiving opposing side images, side-looking from the vehicle, during a biomimetic mode of operation;
iii. an imaging sensor operatively associated with said primary optical system and with said secondary optical system; and,
iv. a mode switch operatively associated with said primary optical system and said secondary optical system for switching between said reconnaissance mode of operation and said biomimetic mode of operation,
wherein said forward view image is sensed by said imaging sensor during said reconnaissance mode of operation and a portion of said forward view image and said opposing side images are simultaneously sensed by said imaging sensor for balancing the optic flow during a biomimetic mode of operation, said imaging sensor providing image data;
b) an image processor connected to said switchable optical system for receiving the image data from said imaging sensor processing said image data and providing right optic flow data, left optic flow data and forward looking data, said image processor also providing mode control feedback data to said mode switch;
c) a biomimetic guidance system for receiving said right optic flow data, left optic flow data, and forward looking data and providing left and right steering commands to a vehicle autopilot; and
d) a reconnaissance system for receiving said forward looking data and providing reconnaissance commands to an end user.

18. The flight control system of claim 17, wherein said primary optical system comprises a reversible electrochemical mirror (REM).

19. A method for providing flight control for a vehicle, comprising the steps of
a) receiving a forward view image, forward from the vehicle, during a reconnaissance mode of operation utilizing a primary optical system;
b) receiving opposing side images, side-looking from the vehicle, utilizing a secondary optical system operatively associated with said primary optical system, during a biomimetic mode of operation;
c) switching between said reconnaissance mode of operation and said biomimetic mode of operation utilizing a mode switch operatively associated with said primary optical system and said secondary optical system;

d) sensing said forward view image during said reconnaissance mode of operation; and,
e) simultaneously sensing a portion of said forward view image and said opposing side images for balancing the optic flow during said biomimetic mode of operation.

20. The method of claim 19, wherein said step of receiving a forward view image primary optical system comprises utilizing a reversible electrochemical mirror (REM).

* * * * *